Nov. 19, 1957   J. E. LINDSAY ET AL   2,813,427
PRESSURE GAUGE
Filed Jan. 5, 1953

JAMES E. LINDSAY
DINO A. MORELLI
  INVENTORS

BY *Lyon & Lyon*

ATTORNEYS

United States Patent Office 2,813,427
Patented Nov. 19, 1957

2,813,427

PRESSURE GAUGE

James E. Lindsay, Glendale, and Dino A. Morelli, Pasadena, Calif.; said Morelli assignor, by mesne assignments, to Robert B. Glassco, Arcadia, Calif.

Application January 5, 1953, Serial No. 329,508

1 Claim. (Cl. 73—411)

Our invention relates to pressure gauges and included in the objects of our invention are:

First, to provide a pressure gauge which is particularly simple of construction in that moving parts are reduced to a minimum and, in fact, consist solely in a single moving element.

Second, to provide a pressure gauge which may be constructed so as to be both compact and light in weight, thus facilitating its use in aircraft and under similar conditions wherein weight and size become important.

Third, to provide a pressure gauge which may be arranged so that the gauge face may be disposed at right angles or parallel, or at any other angle relative to the pressure tube so that the gauge may be readily adapted to various installation conditions.

Other objects and advantages of this invention will be apparent from the following detailed description of a preferred embodiment thereof as illustrated in the accompanying drawing wherein.

Figure 1:
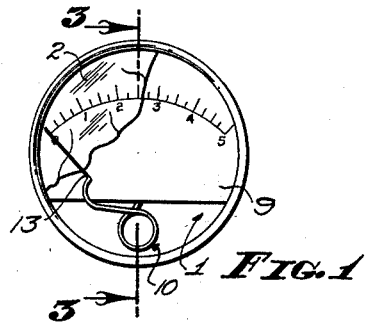
Figure 1 is an end face view of our pressure gauge.

Reference is first directed to Figures 1–4. In this construction a case 1 is provided which is in the form of a shallow cup having cylindrical walls and a flat bottom. The upper open end of the case is provided with a transparent cover 2.

Centered axially within the case 1 is a spool-like pedestal 3 having a blind bore 4 extending upwardly from its lower end. The lower end of the pedestal protrudes through the bottom of the case 1 and is externally screw threaded to receive a nut 5. A pressure tube 6 may be soldered or welded to the protruding end of the pedestal. The pedestal includes a bottom flange 7 which forms a shoulder seating against the bottom of the case and an upper flange 8 which forms a support for a gauge face plate 9. The plate 9 has a segment cut therefrom but otherwise fits snuggly within the case in parallel spaced relation with the transparent cover 2.

Mounted at one side of the case is a helical gauge tube 10 having a plurality of convolutions. The radially inner and outer walls of the gauge tube are flattened. The lower end of the gauge tube forms into a radial extension 11 which is sealed in a small passage 12 extending radially from the bore 4 through the lower flange 7. The upper extremity of the gauge tube projects tangentially and is sealed by a pointer rod 13 which preferably has a curved root end and a straight extended end projecting radially with respect to the axis of the gauge tube.

The convolutions of the gauge tube lie adjacent each other and afford some mutual support so that as the pressure is increased or diminished in the gauge tube the pointer 13 pivots about the longitudinal axis of the tube; that is, the helically coiled portion of the tube as a whole remains cylindrical and does not deviate appreciably from its position although the upper extremity of the coil may move so as to swing the pointer through as much as a 90° arc.

Figure 5:
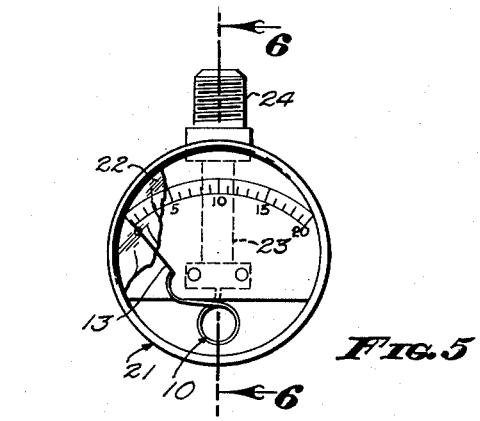
Figure 5 is a face view of a modified form of our pressure gauge.
Figure 2:
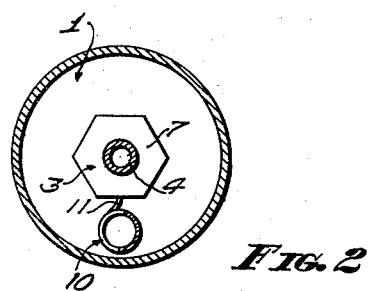
Figure 2 is a transverse sectional view thereof through 2—2 of Figure 3.
Figure 6:
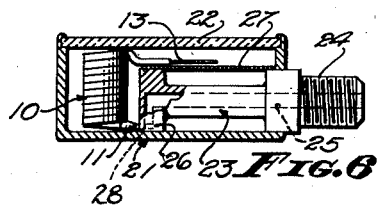
Figure 6 is a sectional view through 6—6 of Figure 5 with portions shown in elevation.
Figure 3:
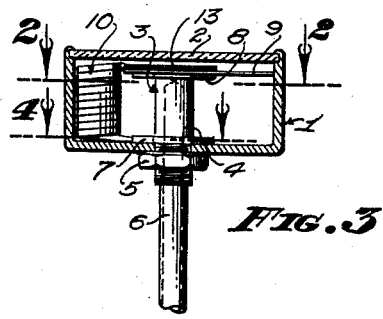
Figure 3 is a diametrical sectional view thereof through 3—3 of Figure 1 with the gauge coil and mounting member shown in elevation.
Figure 4:
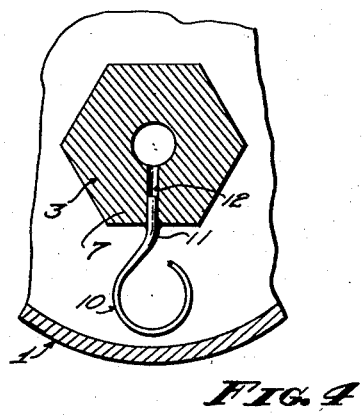
Figure 4 is an enlarged fragmentary sectional view through 4—4 of Figure 3.

In the construction shown in Figures 1–4 the gauge face is disposed perpendicular to the pressure tube connected with the pressure gauge. It is desirable in some instances that the gauge face be substantially parallel to the tube or fitting through which the fluid to be measured is applied. This may be accomplished by the arrangement shown in Figures 5–6.

In this arrangement a case 21 is provided which may be similar to the case 1 except that its side wall is provided with an opening in place of an opening centered in the bottom wall. The case 21 is closed by a cover 22. Fitted within the case 21 and protruding through the lateral opening therein is a body 23, the projected end of which is screw threaded as indicated by 24 for connection to a pressure line. The body is provided with a blind bore 25. The body extends radially into the case and terminates in a flange 26 having parallel upper and lower surfaces. The lower surface rests on the bottom of the case and the upper surface serves to support a gauge face plate 27 similar to the gauge face plate 9.

A helical gauge tube 10 identical to the tube shown in Figures 1–4 is mounted in transverse relation to the bore 25 of the body 23. The lower extremity 11 of the gauge tube is secured in the end of a passage 28 formed in the flanged end 26 and communicating with the bore 25. The pointer 13 of the gauge tube 10 projects over the gauge face 27 and is capable of arcuate movement about the axis of the helical tube in the same manner as in the first described structure.

It will be observed that the only moving part in our gauge is the helical gauge tube. By selection of the proper size and wall thickness of gauge tube and, further, by increasing or diminishing the number of convolutions, the response of the pointer 13 to a given pressure range can be predetermined.

It should be observed that in practice the convolutions of the tube clear each other slightly and that the pointer need not touch any surface, thus, any frictional resistance to change in position of the helical gauge tube is completely avoided. It therefore follows that the gauge is particularly dependable in its operation.

If the degree of accuracy is relatively standard the gauge scale may be printed or otherwise preformed on the gauge face. On the other hand, if extreme accuracy is required, the scale markings may be located by applying known pressures to the gauge and marking the position of the pointer. Tests have indicated that the lineal response of the needle is extremely uniform so that the variation in spacing between the gauge markings is remarkably small.

Having fully described our invention, it is to be understood that we do not wish to be limited to the details herein set forth, but our invention is of the full scope of the appended claim.

We claim:

A pressure gauge comprising a hollow cylindrical casing having a transparent wall at one end thereof, and a back wall having an opening therein at the other end of the casing, a stem inside said casing extending in the direction of the cylindrical axis of the casing, said stem having a portion extending through said opening to the exterior of said casing, the said portion having an axial bore, said stem also having a radially-flanged portion inside said casing, said flanged portion being urged against portions of the back wall adjacent said opening so as to support the stem on the back wall and said flanged portion having a radial passage opening at the periphery of said flange, said passage communicating with said bore, a multi-turn Bourdon tube in said casing, the helical axis of said tube extending in the same direction as the said axis of the casing, said tube and said post being arranged side by side, one end of the tube being closed and having a pointer mounted thereon with said pointer extending between the stem and the transparent wall, and the other end of said tube being supported on the periphery of the flange in communication with the radial passage therein, and a dial plate mounted on the stem between the stem and the pointer.

References Cited in the file of this patent

UNITED STATES PATENTS

| | | |
|---|---|---|
| 514,256 | Bristol | Feb. 6, 1894 |
| 537,588 | Steinle | Apr. 16, 1895 |
| 1,002,877 | Shebol et al. | Sept. 12, 1911 |
| 1,510,193 | Pryor, Jr. | Sept. 30, 1924 |
| 1,837,222 | Kannenstine | Dec. 22, 1931 |
| 2,466,519 | Wantz et al. | Apr. 5, 1949 |

FOREIGN PATENTS

| | | |
|---|---|---|
| 741,030 | France | Dec. 2, 1932 |